June 3, 1958 J. J. GOODRIE 2,837,323
HOSE NOZZLE WITH AERATOR
Filed June 16, 1955
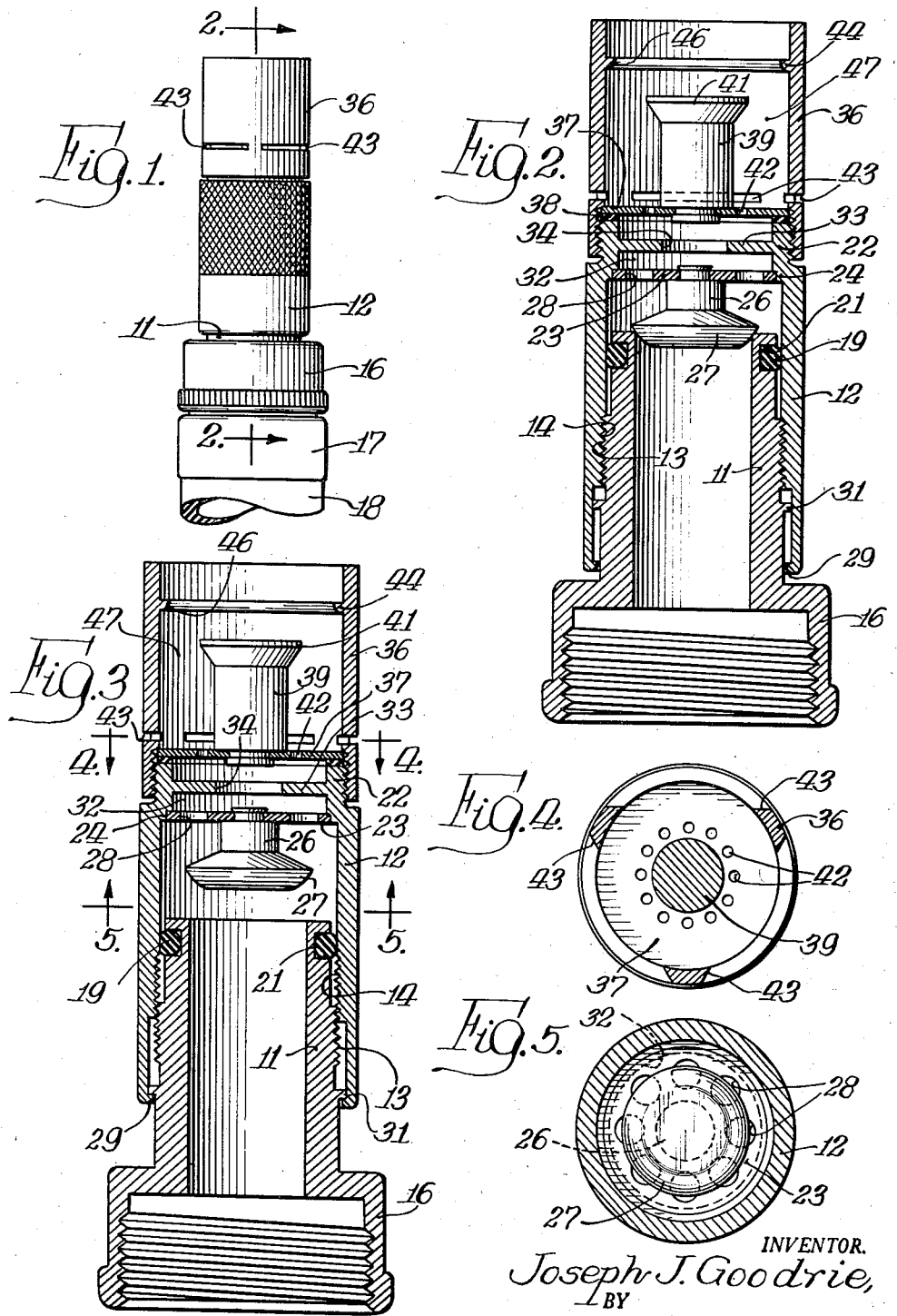
INVENTOR.
Joseph J. Goodrie,
BY
Davis, Lindsey, Hibben & Noyes
Atty's.

2,837,323
HOSE NOZZLE WITH AERATOR

Joseph J. Goodrie, Lansing, Ill., assignor to Wrightway Engineering Co., Chicago, Ill., a corporation of Illinois Application June 16, 1955, Serial No. 516,018

1 Claim. (Cl. 261—71)

This invention relates to improvements in nozzles for hoses or the like.

The usual garden hose for ordinary home use is customarily equipped with an adjustable nozzle by means of which the user can regulate both the water output from the hose and also, to a limited extent, the character of the water stream. For example, one common type of hose nozzle utilizes an adjustable needle type valve which when fully open produces a forceful unitary stream of water and when partially closed produces a diverging spray of water. However, with this type of hose nozzle in order to obtain a fine gentle water spray, as is frequently desirable, the valve means must approach an almost entirely closed position thereby severely restricting the flow rate or volume output from the hose. In other words, it has been impossible to regulate the nozzle to obtain both a fine water spray and a high volume flow rate of water. Moreover, it is common knowledge that with the usual hose nozzle heretofore known, the spray which is obtained is in the form of a wide angle diverging cone-shaped stream which is essentially empty in its center portion so that in effect the spray is merely an annular curtain of water.

A primary object of the present invention is to provide an improved nozzle for hoses or the like which overcomes the aforementioned limitations and disadvantages of the nozzles heretofore in common use.

Another object of the invention is to provide a novel hose nozzle for use where a gentle spray or mist is desired.

Another object of the invention is to provide a novel hose nozzle which is capable of producing a fine gentle spray while at the same time providing a desired high flow rate from the nozzle.

A further object of the invention is to provide a novel hose nozzle adapted to produce a fine gentle spray having a full water pattern and without wide angular divergence.

An additional object of the invention is to provide in a hose nozzle novel adjustable means for producing a regulated fine spray of water which is aerated and substantially non-splashing.

Still another object of the invention is to provide a novel combination of an adjustable hose nozzle and an aerating means.

Other objects and advantages of the invention will become evident from the subsequent detailed description taken in conjunction with the accompanying drawings wherein:

Fig. 1 is a side elevational view of a hose nozzle comprising one specific embodiment of the invention;

Fig. 2 is an enlarged longitudinal cross-sectional view of the nozzle as taken along the line 2—2 of Fig. 1 and showing the nozzle in closed position;

Fig. 3 is a view similar to Fig. 2 but showing the nozzle in open position; and

Figs. 4 and 5 are transverse cross-sectional views through the nozzle as taken along the lines 4—4 and 5—5 respectively, of Fig. 3.

Referring to the drawing, the illustrated embodiment of the invention comprises an inner tubular member 11 and an outer coaxial sleeve member 12 having coacting threaded portions 13 and 14, respectively, for permitting relative axial adjustment between the two members in response to rotation of one member with respect to the other. The inner tubular member 11 is formed at its outer end with an integral enlarged cup-shaped connector 16 having internal threads for detachably securing the nozzle to the usual complementary threaded fitting 17 (Fig. 1) provided on a hose 18. The outer sleeve 12 normally comprises the adjustable member of the nozzle inasmuch as the inner tubular member 11 is rigidly secured to the hose 18 when the connection 16—17 is tightened. A sealing ring 19 of rubber or the like is disposed in an annular groove 21 adjacent the inner end of the tubular member 11 and is in snug sealing engagement with the interior of the sleeve 12 for preventing loss of water through the threaded connection 13—14 in any adjusted position thereof.

The outer end of the sleeve 12 has a restricted diameter end portion 22 which is externally threaded for the purpose hereinafter described. A valve support in the form of an apertured disk 23 is rigidly fitted in a shoulder portion 24 defined at the juncture of the restricted diameter portion 22 and the main body of the sleeve 12. The disk 23 carries a depending member having a relatively small diameter neck portion 26 and an enlarged diameter valve portion 27, the latter being adapted to extend partially into the open inner end of the tubular member 11 for closing the same, as shown in Fig. 2. Thus, the disk 23 and the valve member 26—27 move as a unit with the outer sleeve 12 during axial adjustment of the latter so that the enlarged valve portion 27 coacts with the inner axial end of the tubular member 11 in order to regulate fluid flow from the nozzle. As best seen in Fig. 5, the disk 23 is provided with a plurality of circumferentially arranged apertures or perforations 28.

For limiting the extent of opening movement of the valve means, the lower end of the sleeve 12 has an inturned flange 29 which coacts with an outwardly extending rim or flange 31 on the tubular member 11. Thus, as best seen in Fig. 3, the stop action between the flanges 29 and 31 prevents complete disengagement and detachment between the threaded connections 13—14 when the nozzle is wide open. Of course, as seen in Fig. 2, when the nozzle valve means is completely closed, the engagement of the valve member 27 with the annular end edge of the tubular member 11 limits the extent of axial movement of the sleeve 12 in the opposite direction.

As clearly seen in Figs. 2 and 3, the axial length of the restricted diameter sleeve portion 22 is relatively slight so as to define a relatively small flow restriction or fluid pressure chamber 32 beyond the valve means. The fluid which passes from the valve means obtains access to the chamber 32 through the apertures 28 in the disk 23. Centrally of the chamber 32 I provide a transverse partition or baffle plate 33 having a single central opening 34 which has a smaller area than the total area of the apertures 28 so that the opening 34 functions as an orifice to restrict the flow of fluid from the apertures 28 and also to divert the path of flow as hereinafter described.

To effect aeration of the fluid in order to produce a gentle non-splashing spray, I provide a break-up and aerating device at the outer end of the sleeve 12 beyond the flow restriction chamber 32. For this purpose, a tubular casing 36 has a detachable threaded connection with the threaded small diameter end 22 of the sleeve 12 so as to form in effect a uniform external diameter continuation of the sleeve 12. A slight radial shoulder at the inner wall of the casing 36 serves to clamp a disk 37 against the axial end of the sleeve portion 22 with a resilient gasket 38 being interposed therebetween. The disk 37 carries rigidly therewith an upstanding break-up and mixing body having an elongated neck portion 39 and an outwardly tapering enlarged terminal portion 41. Thus, it will be seen that the valve member 26—27 extends axially rearwardly or upstream from the apertured disk 23 at the upstream side of the flow restriction chamber 32, and the mixing and break-up plug 39—41 extends axially forwardly or downstream from the disk 37 at the downstream side of the chamber 32. The disk 37, as best seen in Fig. 4, has a plurality of circumferentially arranged apertures 42 closely adjacent the neck portion 39 of the break-up plug for discharge of fluid from the chamber 32. The total area of the apertures or openings 42 is less than the area of the orifice 34 so as to further restrict the flow of fluid from the chamber 32. The casing 36 of the aerating device surrounds the break-up body 39—41 in annularly spaced relation and is formed with a plurality of lateral air inlet ports 43 whereby to admit air to the interior of the casing 36. In the present instance, three such ports 43 (Fig. 4) are provided but it will be understood that any desired number of ports may be used. Adjacent the outermost end of the casing 36, a circumferentially internal rib 44 having a curved shoulder portion 46 is provided.

In the operation of the device water under pressure passes from the hose 18 through the inner tubular member 11 and through the open valve member 26—27, as seen in Fig. 3, and thence through the apertures 28 into the chamber 32. As the water passes through the centrally apertured partition 33 in the chamber 32 and thence through the apertures 42 at the outlet side of the chamber, there is substantial restriction to flow regardless of the extent to which the valve member 26—27 is open so that over a wide range of variation in flow rate and available fluid pressure, the chamber 32 runs completely full of fluid under pressure and the valve member 26—27 serves to regulate the pressure in the chamber 32. Moreover, the baffle action of the partition 33 tends to prevent direct undiverted fluid flow from the apertures 28 to the apertures 42 thereby contributing to the pressure chamber effect in the zone 32.

As the water passes from the downstream side of the chamber 32 through the apertures 42 it is broken up into an annular curtain of discrete substantially independent jets which impinge with substantial force against the enlarged break-up plug portion 41, and during passage of the jets outside air is drawn in through the ports 43 and is entrained in the water jets. The violent impingement of the multiple jets with the entrained air therein causes considerable splashing and diversion of the water outwardly against the casing 36 resulting in a very effective break-up and mixing action so that the water is thoroughly aerated and dispersed to produce a gentle non-splashing spray.

The area of the open or unobstructed space at the outlet end of the casing 36 and also the annular space between the casing 36 and the break-up means 39—41 is substantially greater than the area of the valve opening when the valve 26—27 is in its wide open position as shown in Fig. 3. Furthermore, the total area of the apertures 42 at the outlet or downstream side of the chamber 32 is such that the chamber 32 runs full of water at all times over a wide range of nozzle valve settings and variations in pressure of the water being supplied to the hose. Consequently, the chamber 32 substantially compensates for variations in flow rate and pressure so that a plurality of water jets issue from the apertures 42 with substantial force under all normal conditions of operation. Moreover, as a result of the area relationships above mentioned, there is no tendency for water to fill the mixing chamber space, designated at 47, within the aerating device. Thus, the water jets from the apertures 42 are always surrounded by air and proper impingement and break-up of the water stream with effective entrainment of air are realized because of the absence of any substantial restrictions to fluid flow downstream from the apertures 42. As the mixture of commingled air and water passes beyond the break-up plug 41, part of the mixture impinges upon the curved shoulder portion 46 thereby resulting in further break-up and splashing of the air-water mixture. As the mixture emerges from the open end of the casing 36, it is in the form of a narrow angle axially directed spray having a very gentle or soft non-splashing action as a result of the high degree of aeration and mixing of the water and air.

As heretofore mentioned, the conventional hose nozzle when adjusted to provide a fine spray results in a relatively wide angle diverging or conical spray which is substantially empty in the center portion so that only a conical sheet or curtain of water is obtained. Obviously, with a spray pattern of this type it is extremely difficult to obtain effective utilization of the spray such as in the watering of flowers or shrubs or in various washing and rinsing operations. One of the principal advantages of the present invention is that the water pattern of the spray obtained with the nozzle just described is substantially uniform and full so that effective spray action is realized throughout the cross-sectional area of the spray. Furthermore, the angle of divergence of the spray from my present nozzle is relatively narrow as compared with the nozzles heretofore used thereby permitting relatively large quantities of water in soft spray form to be directed to a desired area.

Another very important advantage of the present invention is the fact that a highly effective gentle spray is obtained from the nozzle even though the valve means is open to a very wide extent so as to have a high volume flow rate from the nozzle. As previously explained, with the hose nozzles heretofore in common use a fine water spray is obtained only during restricted or slight opening of the valve so that the volume output from the nozzle is thereby drastically reduced. By means of the present invention, an effective gentle spray is obtained in large quantities even when the valve means of the nozzle is fully open so that the fluid in the chamber 32 is at a relatively high pressure.

Although the invention has been described with particular reference to a certain specific structural embodiment thereof, it will be understood that various modifications and equivalent structures may be resorted to without departing from the scope of the invention as defined in the appended claim.

I claim:

In a hose nozzle, a tubular member adapted to be connected at one end thereof to the outlet of a hose, elongated sleeve means concentrically surrounding said tubular member and threadedly connected therewith for axial adjustment of the sleeve means relative to said tubular member, a first apertured disk carried by said sleeve means, a valve member extending rearwardly from said first disk and having a restricted neck portion secured centrally on said first disk and an enlarged end portion cooperable with the opposite end of said tubular member for regulating the flow from the nozzle in response to axial adjustment of said sleeve means relative to said tubular member, the apertures in said first disk being spaced outwardly relative to said neck portion, aerating means mounted on said sleeve means forwardly of said first disk and including a second apertured disk and a break-up and mixing body carried by said second disk, said break-up and mixing body extending forwardly from said second disk and having an enlarged terminal portion at its outer end adapted to have liquid jets from said second apertured disk impinge thereon and said sleeve means being provided with air inlet ports for entrainment of air during liquid flow through the aerating means, said second disk being spaced axially forwardly of said first disk to define a flow restriction and pressure chamber therebetween, and baffle means comprising a transverse partition disposed substantially centrally between said disks and being imperforate except for a central opening therethrough, the imperforate portion of said partition being interposed in flow blocking relation between the apertures in the respective disks whereby to prevent direct passage of liquid from the apertures in the first disk to the apertures in the second disk and thereby causing diversion of flow through said central opening and the total area of the apertures in said second disk being less than the area of the central opening in said partition, so that said chamber is always filled with liquid, thereby obtaining proper operation of said aerating means over a wide range of valve settings.

References Cited in the file of this patent

UNITED STATES PATENTS

| | | | |
|---|---|---|---|
| 2,096,912 | Morris | Oct. 26, | 1937 |
| 2,120,620 | Mowery | June 14, | 1938 |
| 2,247,310 | Rockwood | June 24, | 1941 |
| 2,474,332 | Sciuto | June 28, | 1949 |
| 2,523,084 | Adragna | Sept. 19, | 1950 |
| 2,564,060 | Gettins | Aug. 14, | 1951 |
| 2,565,554 | Goodrie | Aug. 28, | 1951 |
| 2,657,024 | Reinecke | Oct. 27, | 1953 |
| 2,664,278 | Aghnides | Dec. 29, | 1953 |

FOREIGN PATENTS

| | | | |
|---|---|---|---|
| 590,616 | Germany | Jan. 6, | 1934 |